United States Patent [19]

Midavaine et al.

[11] Patent Number: 4,694,458
[45] Date of Patent: Sep. 15, 1987

[54] DEVICE FOR FREQUENCY STABILIZING AN RF EXCITATION LASER

[75] Inventors: Thierry, R. Midavaine; Michel M. Ouhayoun, both of Paris, France

[73] Assignee: S.A.T. (Societe Anonyme de Telecommunications), Paris, France

[21] Appl. No.: 743,746

[22] Filed: Jun. 12, 1985

[30] Foreign Application Priority Data

Jun. 19, 1984 [FR] France ............................. 84 09593

[51] Int. Cl.$^4$ ............................................. H01S 3/13
[52] U.S. Cl. ......................................... 372/32; 372/38
[58] Field of Search ......................... 372/38, 64, 83, 32

[56] References Cited

U.S. PATENT DOCUMENTS 4,443,877  4/1984  Chenausky et al. ................. 372/38
4,451,766  5/1984  Angle et al. ........................... 372/38

FOREIGN PATENT DOCUMENTS 2083440  12/1971  France .

OTHER PUBLICATIONS

Optics Communications, vol. 30, No. 2, aout 1979, pp. 213-218, Amsterdam, NL; A. L. S. Smith et al.: "Opto-Galvanic Stabilized CO2 Laser".
Review of Scientific Instruments, vol. 46, No. 4, avril 1975, pp. 409-412, American Institute of Physics, New York, U.S.; W. H. Thomason et al.: "An Inexpensive Method to Stabilize the Frequency of a CO2 Laser", *Paragraphe II; FIG. 2*.
R. W. Beatty: "Microwave Impedence Measurements and Standards", National Bureau of Standards Monograph 82, 12 aout 1965, pp. 22-30, *Paragraphe 10.3, Single Directional Coupler Reflectometer*.

Primary Examiner—Gene Wan
Attorney, Agent, or Firm—Stevens, Davis, Miller & Mosher

[57] ABSTRACT

A device is provided for stabilizing the frequency of an RF excitation laser, comprising a means for matching the impedance of the cavity of the laser with that at the output of the excitation generator. The matching means are connected through a line to a circulator which is connected to the generator and to an RF diode. A synchronous detector is connected to the outputs of the diode and of an oscillator. The output of the detector is connected through an integrator to a piezoelectric ceramic supporting one of the mirrors of the cavity of the laser, modulated by the oscillator. The phase shift between the signal reflected by the cavity and the signal of the oscillator and the amplitude of the former allow the cavity to be stabilized in frequency.

10 Claims, 3 Drawing Figures

DEVICE FOR FREQUENCY STABILIZING AN RF EXCITATION LASER

BACKGROUND OF THE INVENTION

1. Field of the Invention

The present invention relates to a device for frequency stabilizing an RF excitation laser comprising a resonant cavity filled with a laser gas and having an impedance, a radio-frequency (RF) alternating power generator having an output impedance, electrodes for exciting the laser gas connected to the generator and means adapted for varying the frequency of the laser.

2. Description of the Prior Art

It will be recalled that a laser has multiple applications, not only medical but also military applications for example.

The emission or absorption spectral lines in the gain profiles of lasers, i.e. in the curves representative of the light intensity of the lasers as a function of the frequency, about particular resonance frequencies, have been used for a long time for stabilizing the lasers, i.e. for fixing the emission frequency on one of the spectral lines, But for that, a light intensity detector was required, and that was not practical.

Then, since the efficient excitation sections of the molecules of the laser gas media, by electron collision, vary depending on their nature and, for given molecules, depending on their energy level, it was realized that, about resonance frequencies, the population of the levels participating in the amplification or the absorption varies in the same manner as the light intensity as a function of the frequency of the incident optical emission. Now, variation of population causes variation in the macroscopic ionization properties of the laser plasma and so of its impedance.

Since the impedance of a laser plasma varies then with the frequency as the light intensity, it was then proposed to stabilize lasers by means of their impedance. However, such an optogalvanic stabilization has only been practised up to now for continuous excitation lasers and more particularly for stabilizing them at the top of a spectral line. Attempts have been made to apply this optogalvanic stabilization technique to non continuous excitation lasers but unsuccessfully. It should be mentioned that in the case of continuous excitation lasers application of the technique was simple because of the different natures of the excitation signal and of the stabilization signal, one being continuous and the other alternating.

The applicant began to study again the problem of optogalvanic stabilization of non continuous excitation lasers, with RF excitation, after the appearance in 1980-1981 of optogalvanic RF discharge spectroscopy. It is a matter of producing, in the gas medium of a cell to be examined, atoms excited by a plasma caused by a radiofrequency oscillator, coupled to the cell, either capacitively by external electrodes fixed to the cell or inductively by means of a coil surrounding the cell. Because of the coupling, the impedance of the gas medium of the cell forms one of the elements of the load of the oscillator. This impedance is modified by photon absorption caused by incident laser radiation at variable frequency, and it is this impedance modification which is detected, either directly at the level of the oscillator whose frequency or amplitude is modulated accordingly or by means for example of an antenna. This laser spectroscopy technique is more especially described in the article by D. R. Lyons et al. Published in Optics Communications, volume 38, No. 1, of 1.7.1981 and in the article by C. Stanciulescu et al. published in Applied Physics Letters 37(10) of 15.11.1980.

However, the analysis of a gas by optogalvanic RF discharge laser spectroscopy is one thing and the optogalvanic stabilization of a laser cavity is another, if only because of the fact that, in the problem raised, the cell containing the gas medium and the laser cavity are intermingled, and that, in known spectroscopy techniques, the RF powers brought into play are particularly small.

However it may be, the Applicant then resolved the problem of the optogalvanic stabilization of an RF excitation laser and today proposes his invention.

SUMMARY OF THE INVENTION

The present invention relates to a device for frequency stabilizing an RF excitation laser comprising a resonant cavity filled with a laser gas and having an impedance, a radio-frequency (RF) alternating power generator having an output impedance, electrodes for exciting the laser gas connected to the generator and means adapted for varying the frequency of the laser, characterized by the fact that the generator and the electrodes are connected by means matching the impedance of the laser cavity to the output impedance of the generator and it is provided with means adapted for receiving an impedance mismatch signal reflected by the cavity and connected to means for varying the frequency through a servo-control circuit.

Since the impedance of the excitation head is matched to that of the supply line, or since the power reflected by the cavity is reduced to a minimum, a modification of the frequency causes a modification of the impedance of the laser plasma and so the appearance of a reflected signal, or a variation of this signal if, at matching, this is not quite zero. This reflected signal forms indeed an optogalvanic signal.

In the preferred embodiment of the device of the invention, the generator and the mismatch signal reception means are connected to a matching means by coupling means adapted for preventing the excitation signal from being received by the reception means and the mismatch signal from being received by the generator.

In this case, the matching means are mounted at the end of a line carrying not only the excitation signal but also the reflected mismatch signal. The coupling means, advantageously a circulator or a directional coupler, directs the excitation signal to the electrodes of the laser cavity and the reflected signal to the servo-control circuit.

BRIEF DESCRIPTION OF THE DRAWINGS

The invention will be better understood from the following description of a preferred embodiment of the device of the invention with reference to the accompanying drawings in which.

DESCIRPTION OF THE PREFERRED EMBODIMENT

Figure 1:
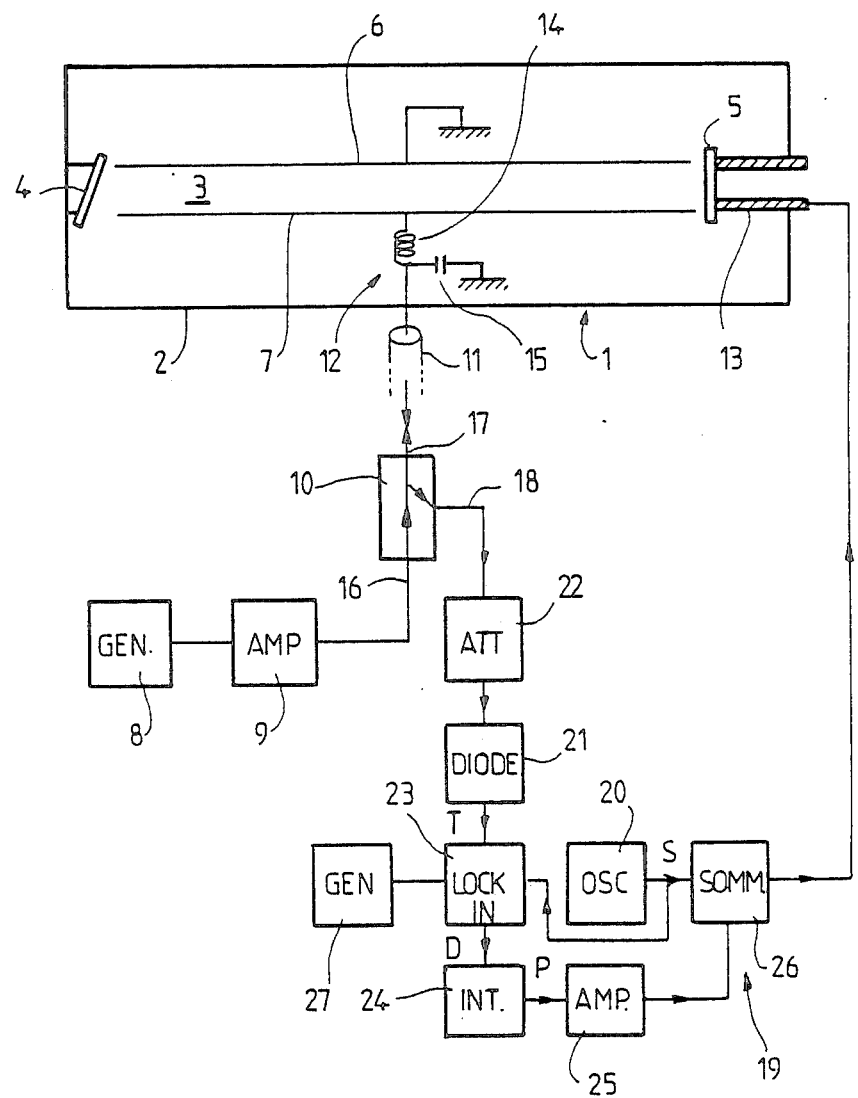
FIG. 1 shows the block diagram of the device of the invention, applied to an RF excitation laser.

In FIG. 1 can then be seen a laser 1 comprising, in an external metal structure 2, a resonant cavity 3 filled with a laser gas, for example a $CO_2$ based mixture, closed at both its ends by two mirrors 4 and 5 between which extend two electrodes 6 and 7 over practically the whole length of the structure 2.

Electrode 6 is connected to ground and electrode 7 is connected to a radio-frequency (RF) alternating power generator 8 through an RF power amplifier 9, a three path circulator 10, a coaxial line 11 and a matching circuit 12, all these elements being connected in the order in which they have just been mentioned. Electric pumping and laser emission of the cell is obtained here by a transverse field, i.e. perpendicular to the optical axis. A laser could also be considered with longitudinal RF excitation, in the lengthwise direction of the cell, although in this case a certain transverse excitation would also be induced.

Mirror 5 is mounted at the end of piezoelectric ceramic element, formed by a tube 13, shown in section for a better understanding, another substantially end plane of which is fixed to structure 2. Excitation of ceramic 13 causes compression thereof and so movement of mirror 5 away from mirror 4, so an increase in the length of the resonant cavity and consequently a variation of the laser frequency.

The purpose of the matching circuit 12 which comprises, in a way known per se, an inductance 14 and a capacitor 15 is to match, for a given frequency, the impedance of laser cavity 3 to the output impedance of generator 8 and to minimize the power reflected by the laser cavity 3 in line 11. From the matching state, modification of the frequency of the laser causes a modification of the impedance of the plasma and consequently a variation of the reflected power. This variation of the reflected power forms an optogalvanic signal which may be extracted from line 11 by means of circulator 10 or by means of any other directional coupler, preventing this optogalvanic signal from being received by generator 8 or, in other terms, preventing cavity 3 from radiating into generator 8.

The circulator 10 is here a circulator having three paths 16, 17, 18. In the propagation direction from 16 to 18, i.e. from the generator towards the cavity, circulator 10 does not couple path 18 whereas, in the other direction, it couples it for directing the reflected optogalvanic signal from path 17 towards path 18. Generally, a circulator is multipole in which one path is coupled only to one other path in a non reciprocal way.

Let us consider first of all the case of stabilizing at the top of the spectral line and let us emphasize here agains that, for the top of line frequency, since the impedance of the laser head is matched to the output impedance of generator 8, the reflected signal is zero or substantially zero and in any case minimized. A servo-control loop 19, connected between circulator 10 and ceramic 13, will ensure this stabilization.

The frequency correction scanning of the laser cavity 3 is obtained by applying a DC correction voltage to the piezoelectric ceramic 13, a positive or negative voltage depending on the direction of the correction to be applied. If the frequency to be stabilized F is exceeded for example, the correction voltage must be negative and in the opposite case it must be positive. Since a spectral line R of the laser cavity 3, i.e. the envelope of the laser signal as a function of the frequency, has a bell shape in figure 2, it will be noted that if there is applied to the piezoelectric ceramic 13 an alternating superimposed modulation voltage S (FIG. 2) of low amplitude, the envelope line is modulated in accordance with a signal T which is also alternating (FIG. 2), in phase opposition with respect to the signal S, above and below frequency F. The peak to peak amplitude of signal T crosses through zero at frequency F. If signal T is applied to a synchronous detection or lock-in amplifier, signal S being taken as reference, as a function of frequency F, a signal D is obtained (FIG. 3) whose values are proportional to those of the differential coefficient of signal R as a function of frequency F, signal D being positive below point F and negative above point F. Signal D supplies the amplitude and the sign of the DC voltage to be applied to the piezoelectric ceramic 13 for correcting the frequency of the laser.

In fact, if the plasma in the resonant cavity 3 reflects a mismatch signal into the servo-control circuit 19 through the circulator 10, it is because the frequency is not F and in this case the integrated signal D which will result therefrom will modify this frequency in the desired direction. It is only for frequency F that no DC voltage is applied to ceramic 13, the value of signal D being zero.

The servo-control circuit 19 which elaborates the different signals described above, will now be described in its turn in so far as its structure is concerned.

This servo-control circuit or valve comprises a low frequency oscillator 20 operating here at a few hundred Hz and delivering the signal S intended to excite the ceramic 13 which will thus vibrate but with a low amplitude. An RF diode 21 is connected to path 18 of the circulator 10, through an attenuator 22, for example of 10 dB, for protecting the diode which can only receive low powers, for example of the order of 50 mW. Diode 21 which detects the reflected and attenuated mismatch signal delivers, after rectification, the envelope T of this signal. The output of diode 21 as well as the output of oscillator 20 are connected to the signal and reference inputs, respectively, of a synchronous detection or lock-in amplifier 23 which outputs the signal D representative of the phase shift between the signal delivered by oscillator 20 and diode 21 and of the amplitude of the synchronous component of the signal of diode 21.

Signal D is integrated in an integrator 24 outputting the DC signal P, which may vary for example from 0 to 5 V. This signal P is amplified in a high voltage amplifier 25, delivering a similar signal, varying for example from 0 to 1000 V, which is applied to ceramic 13 through a summator 26 also receiving as input the output signal S of oscillator 20 and whose output is connected to the ceramic 13.

In the case where it is desired to stabilize the laser at another frequency than that F of the top of the spectral line, it is sufficient to apply to the lock-in detector 23 a shift signal or offset voltage, delivered by a generator 27, for frequency shifting the passage of curve D through the axis of the abscissa f.

Figure 2:
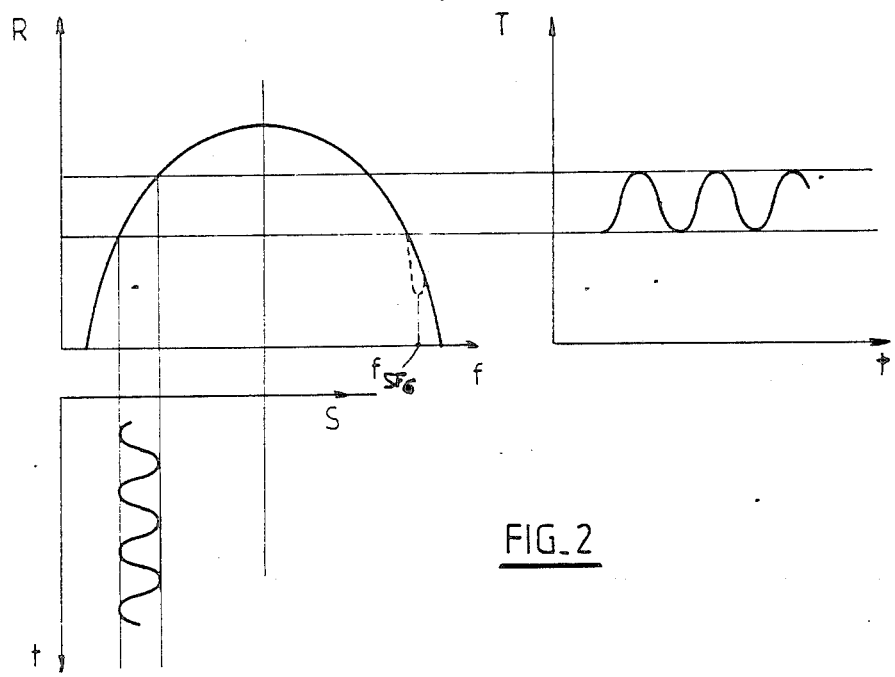
FIG. 2 shows one of the spectral lines of the laser of FIG. 1, a modulation signal and the mismatch signal which results therefrom.
Figure 3:
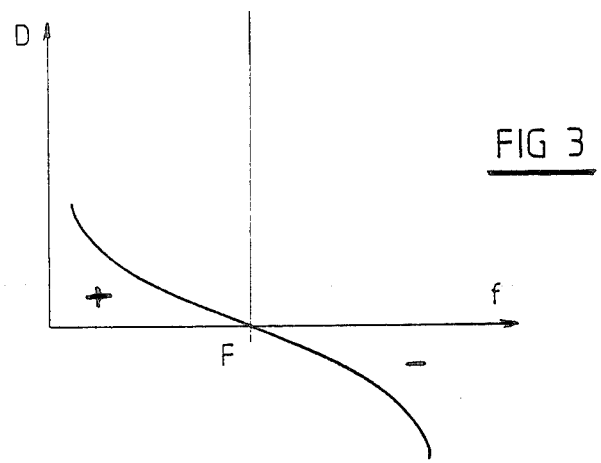
FIG. 3 shows the correction signal to be applied.

By introducing into the laser cavity 3 a cell for example of very low pressure sulfur hexafluoride $SF_6$, modifying the spectral line R of FIG. 2, about its frequency $f_{SF_6}$, depending on its own spectral line, the frequency of cavity 3 may be stabilized more easily and still more finely at this frequency $f_{SF_6}$, because of the narrowness of the hole thus created and because of the steep slope of the derivative of the curve on each side of this frequency.

At the frequency to be stabilized, the ideal which is never reached is that no signal is reflected by the laser or that the impedance matching is perfect. In this respect, it is then preferably to provide this optogalvanic stabilization on wave-guide lasers and more particularly monolithic lasers, with which matching may be achieved within a few hundred mW, for a laser power of 50 W. Such monolithic lasers are more especially described in the French patent application in the name of the Applicant, published under the U.S. Pat. No. 2,530,087.

In the device which has just been described, the same line 11 connected to a circulator 10 was used both for the signal for exciting the generator 8 and the mismatch signal reflected by the laser.

Such an arrangement is not imperative, even though it is the simplest and the neatest. A second separate line could also have been used for collecting the optogalvanic signal by means of an antenna, without requiring a circulator. But it is better to eliminate a line and its end equipment than a circulator or directional coupler.

What is claimed is:

1. A device for stabilizing the frequency of an RF excitation laser comprising:
    a resonant cavity having at least two mirrors filled with the laser gas and having an impedance;
    an RF radio-frequency alternating power generator for generating an excitation signal having an output impedance;
    electrodes for exciting the laser gas connected to the generator;
    means for causing the frequency of the laser to vary;
    means, connecting said generator and said electrodes, for matching the impedance of the laser cavity to the output impedance of said generator; and
    means responsive to an impedance mismatch signal reflected by the cavity, for controlling said causing means to vary said frequency through a servo-control circuit.

2. The device as claimed in claim 1, wherein said generator and said means responsive to said mismatch signal are connected to matching means by coupling means for preventing the excitation signal from being received by the reception means and the mismatch signal from being received by the generator.

3. The device as claimed in claim 2, wherein said coupling means comprises a three path circulator.

4. The device as claimed in claim 1, wherein said servo-control circuit comprises:
    means for modulating said causing means;
    means adapted for detecting a phase shift between a signal of the modulating means and a signal of the controlling means and the amplitude of a synchronous component of the signal of the controlling means; and
    means for integrating a signal from the detecting means and for controlling the causing means.

5. The device as claimed in claim 4, including a shift generator having an output wherein said detecting means are connected to the output of a shift generator.

6. The device as claimed in claim 1, wherein said servo-control circuit comprises:
    an oscillator connected to the causing means;
    an RF diode means, having an output, for directing the mismatch signal reflected by the cavity;
    a synchronous detection or lock-in amplifier connected to the outputs of the oscillator and of the diode;
    an integrator having an input connected to the output of the synchronous amplifier and having an output; and
    a summator having inputs responsive to the output of said oscillator and to the output of said integrator, and an output connected to an input of said causing means.

7. The device as claimed in claim 6, including an attenuator responsive to said mismatch signal wherein said diode is connected to an output of said attenuator; further including an amplifier having an input and said integrator is connected to the input of said amplifier.

8. The device as claimed in claim 1, wherein said causing means comprise a piezoelectric ceramic supporting at least one of the two mirrors of said resonant cavity.

9. The device as claimed in claim 1, wherein said resonant cavity of the laser contains a cell of sulfur hexafluoride at very low pressure.

10. The device as claimed in claim 1, wherein said laser is a monolithic laser.

* * * * *